(12) United States Patent
Li

(10) Patent No.: US 8,222,869 B2
(45) Date of Patent: Jul. 17, 2012

(54) SYSTEM AND METHOD FOR BATTERY CHARGING

(75) Inventor: Guoxing Li, Sunnyvale, CA (US)

(73) Assignee: O2Micro, Inc, Santa Clara, CA (US)

( * ) Notice: Subject to any disclaimer, the term of this patent is extended or adjusted under 35 U.S.C. 154(b) by 528 days.

(21) Appl. No.: 11/827,144

(22) Filed: Jul. 5, 2007

(65) Prior Publication Data

US 2009/0009141 A1 Jan. 8, 2009

(51) Int. Cl.
*H02J 7/04* (2006.01)
(52) U.S. Cl. .......................... 320/141; 320/134; 320/159
(58) Field of Classification Search .................. 320/141, 320/132, 134, 159, 164
See application file for complete search history.

(56) References Cited

U.S. PATENT DOCUMENTS

| 5,710,506 A * | 1/1998 | Broell et al. .................. 320/145 |
| 6,037,750 A * | 3/2000 | Von Novak ................... 320/132 |
| 6,337,563 B2 * | 1/2002 | Takimoto et al. ............. 323/284 |
| 2004/0066174 A1 * | 4/2004 | Choi ............................. 320/149 |
| 2004/0212347 A1 * | 10/2004 | Fogg ............................. 320/127 |

* cited by examiner

*Primary Examiner* — Edward Tso
*Assistant Examiner* — Aaron Piggush

(57) ABSTRACT

A charging circuit includes a pulse generator and a controller coupled to the pulse generator. The pulse generator is used to generate a plurality of pulses to control a charging switch. The controller is used to control a pulse density of the plurality of pulses. A charging current flowing through the charging switch can be adjusted according to the pulse density.

20 Claims, 4 Drawing Sheets

SYSTEM AND METHOD FOR BATTERY CHARGING

TECHNICAL FIELD

This invention relates to a battery charging system, and more particularly to a battery pre-charging system.

BACKGROUND ART

Battery pre-charging can be enabled when battery voltage is low. A pre-charging current is relatively small compared to a normal charging current during normal charging. Conventional battery charging systems perform battery pre-charging by controlling a switch coupled in series with a current limiting resistor. Such battery charging systems are costly. In addition, such battery charging systems have large power dissipation and low efficiency during pre-charging.

SUMMARY

A charging circuit includes a pulse generator and a controller coupled to the pulse generator. The pulse generator is used to generate a plurality of pulses to control a charging switch. The controller is used to control a pulse density of the plurality of pulses. Advantageously, a charging current flowing through the charging switch can be adjusted according to the pulse density.

BRIEF DESCRIPTION OF THE DRAWINGS

Features and advantages of embodiments of the claimed subject matter will become apparent as the following Detailed Description proceeds, and upon reference to the drawings, wherein like numerals depict like parts, and in which:

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1A:
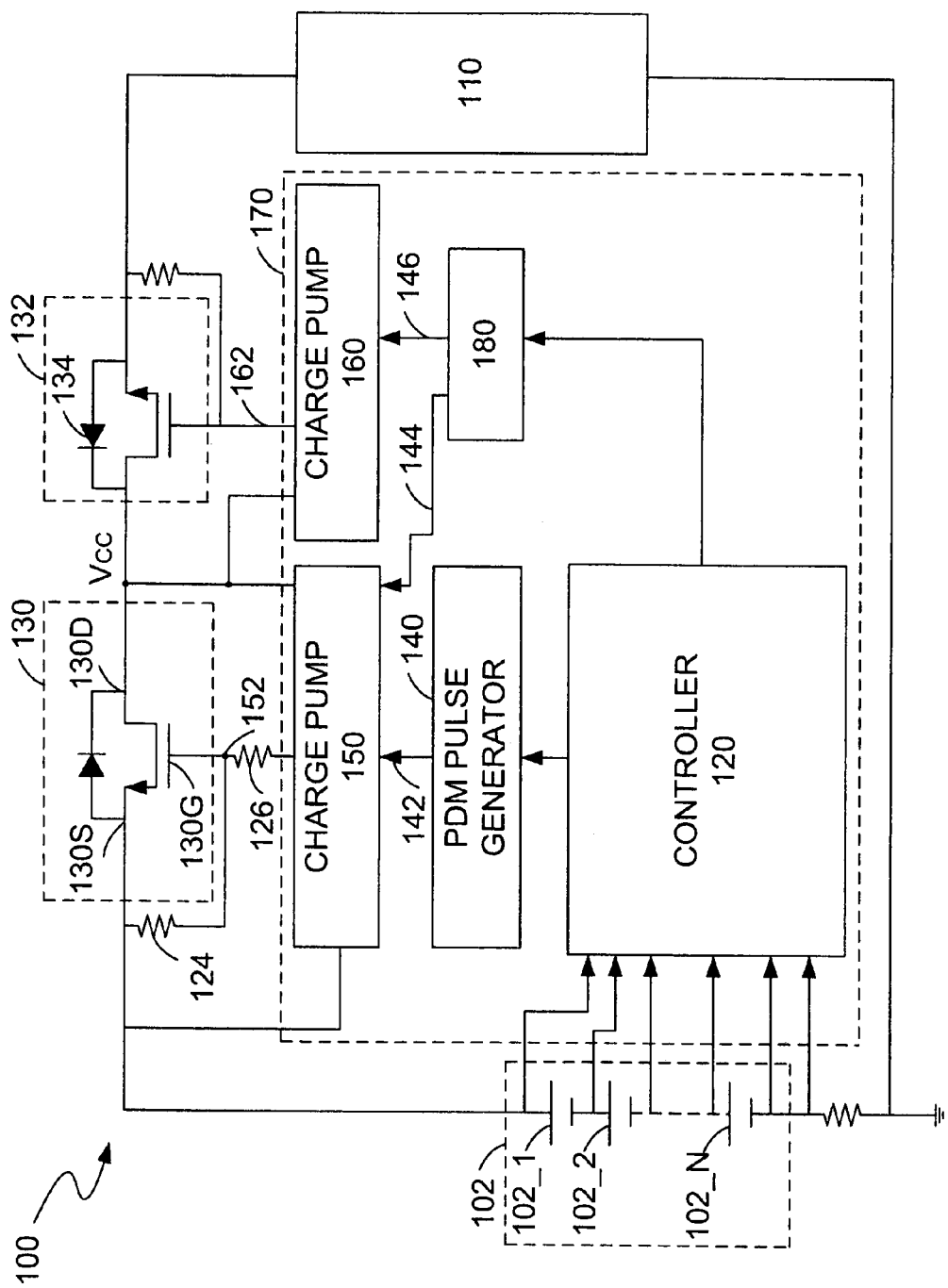
FIG. 1A shows a block diagram of a battery charging system, in accordance with one embodiment of the present invention.

FIG. 1A shows a block diagram of a battery charging system 100, in accordance with one embodiment of the present invention. As shown in FIG. 1A, a charger 110 can be used to charge a battery pack 102 having a plurality of cells 102_1-102_n. In one embodiment, a charging circuit 170 coupled to the battery pack 102 and the charger 110 controls a charging current flowing from the charger 110 to the battery pack 102 by controlling a charging switch 130. A discharging switch 132 can be used to control a discharging current during discharging. During charging, the discharging switch 132 can be on or off. If the discharging switch 132 is off, a charging current can flow from the charger 110 to the battery pack 102 through a body diode 134 of the discharging switch 132.

In one embodiment, the charging circuit 170 includes a pulse generator 140 for generating a plurality of pulses 142 to control the charging switch 130, and a controller 120 coupled to the pulse generator 140 for controlling a pulse density of the plurality of pulses 142. If N pulses are generated by the pulse generator 140 during a time period T, the pulse density $D_p$ is equal to the number of pulses N divided by the time period T ($D_p$=N/T). Advantageously, a charging current flowing through the charging switch 130 can be adjusted according to the pulse density of the plurality of pulses 142, in one embodiment. In one embodiment, the charging switch 130 can include, but is not limited to a transistor, e.g., an n-type metal-oxide-semiconductor field-effect transistor.

In one embodiment, the pulse generator 140 is a PDM (pulse density modulation) pulse generator. The PDM pulse generator 140 can be used to generate a plurality of normally distributed pulses 142 over a time period. The PDM pulse generator 140 can have numerous configurations. Advantageously, the controller 120 controls a pulse density of the plurality of PDM pulses 142 generated by the PDM pulse generator 140, in one embodiment.

A charge pump 150 coupled to the PDM pulse generator 140 can be used to receive the plurality of PDM pulses 142 from the PDM pulse generator 140 and to generate a driving signal 152 which controls the charging switch 130. More specifically, the charge pump 150 receives an input voltage Vcc and the plurality of PDM pulses 142, and generates the driving signal 152 that controls a gate voltage of the charging switch 130, thereby controlling a conductance of the charging switch 130. In one embodiment, the voltage of the driving signal 152 is higher than the voltage of the input signal Vcc, and the voltage of the driving signal 152 is sufficient to conduct the charging switch 130 during charging. The charge pump 150 can be a single stage charge pump with numerous configurations or a multi-stage charge pump with numerous configurations, in one embodiment.

Advantageously, in one embodiment, the controller 120 monitors a battery voltage of the battery pack 102 (and/or cell voltages of cells 102_1-102_n) and a charging current, and controls the pulse density of the plurality of PDM pulses 142 generated by the PDM pulse generator 140. The charge pump 150 receives the plurality of PDM pulses 142 and generates a driving signal 152 to control a conductance of the charging switch 130, in one embodiment. Therefore, the conductance of the charging switch 130 can be controlled according to the pulse density of the PDM pulses 142. Accordingly, the charging current flowing through the charging switch 130 can be adjusted by controlling the pulse density of the plurality of PDM pulses 142.

As show in FIG. 1A, the charging switch 130 has a gate 130g, a source 130s, and a drain 130d. The charging current flowing through the charging switch 130 is equal to the drain-source current $I_{DS}$ of the charging switch 130, in one embodiment. According to characteristics of the charging switch 130

(e.g., an n-type metal-oxide-semiconductor field-effect transistor) during an active (linear) region, an increment of the drain-source current LIDS during a time period T is given by:

$$\Delta I_{DS} \approx 2K(\overline{V_{GS}} - V_T)\Delta V_{GS} + K(\Delta V_{GS})^2 \approx 2K(\overline{V_{GS}} - V_T)\Delta V_{GS}, \quad (1)$$

where $V_T$ represents a threshold voltage of the charging switch 130, $\Delta V_{GS}$ represents an increment of the gate-source voltage of the charging switch 130 during the time period T, $\overline{V_{GS}}$ represents an average gate-source voltage of the charging switch 130 during the time period T, and K represents a parameter of the charging switch 130, which is related to the fabrication process. As shown in equation (1), the increment of the drain-source current LIDS during the time period T is proportional to the increment of the gate-source voltage $\Delta V_{GS}$ during the time period T. Consequently, the charging current can be adjusted by controlling the gate-source voltage of the charging switch 130. In one embodiment, a resistor 126 coupled to the charging switch 130 is used as a low pass filter to reduce fluctuation of the gate-source voltage of the charging switch 130.

According to characteristics of the charge pump 150, a voltage increase $\Delta V_1$ at the gate 130g of the charging switch 130 during the time period T can be given by:

$$\Delta V_1 = \frac{\eta N C_{150} V_{CC}}{C_{130g}}, \quad (2)$$

where N represents the number of PDM pulses 142 received by the charge pump 142 during the time period T, $C_{150}$ represents a capacitance of a charge pump flying capacitor in the charge pump 150, Vcc represents an input voltage of the charge pump 150, $C_{130g}$ represents a capacitance of a gate capacitor at gate 130g of the charging switch 130, and η represents an efficiency of the charge pump 150 (in one embodiment, for a single stage charge pump, η=1, for a multi-stage charge pump, 0<η<1).

In one embodiment, a pull-down resistor 124 is coupled to the gate 130g and the source 130s of the charging switch 130. As such, during the time period T, a current will flow from the gate capacitor (at gate 130g) to source 130s via the pull-down resistor 124. Therefore, there is a voltage decrease $\Delta V_2$ at the gate 130g of the charging switch 130 during time period T, which can be given by:

$$\Delta V_2 = \frac{Q_{130g}}{C_{130g}} = \frac{\frac{\overline{V_{GS}}}{R_{124}}T}{C_{130g}}, \quad (3)$$

where $Q_{130g}$ represents a total electric quantity decreased at the gate capacitor during the time period T, and $R_{124}$ represents a resistance of the pull-down resistor 124.

Accordingly, the total increment of the gate voltage (at gate 130g) of the charging switch 130 during the time period T is equal to $\Delta V_1 - \Delta V_2$. In one embodiment, the total increment of the gate-source voltage $\Delta V_{GS}$ of the charging switch 130 during the time period T is equal to the total increment of the gate voltage (at gate 130g) of the charging switch 130. Accordingly, the total increment of the gate-source voltage $\Delta V_{GS}$ of the charging switch 130 during the time period T can be given by:

$$\Delta V_{GS} = \Delta V_1 - \Delta V_2 = \frac{NC_{150}V_{CC} - \frac{\overline{V_{GS}}}{R_{124}}T}{C_{130g}}. \quad (4)$$

Since the pulse density $D_P$ of the PDM pulses 142 is equal to the number of the PDM pulses N divided by the time period T, equation (4) becomes:

$$\begin{aligned}\Delta V_{GS} &= \Delta V_1 - \Delta V_2 \\ &= \frac{NC_{150}V_{CC} - \frac{\overline{V_{GS}}}{R_{124}}T}{C_{130g}} \\ &= \frac{D_P T C_{150} V_{CC} - \frac{\overline{V_{GS}}}{R_{124}}T}{C_{130g}}.\end{aligned} \quad (5)$$

Therefore, the total increment of the gate-source voltage $\Delta V_{GS}$ of the charging switch 130 during the time period T is proportional to the pulse density $D_P$ of the PDM pulses 142 during the time period T. As described above, the increment of the charging current during the time period T is proportional to the increment of the gate-source voltage $\Delta V_{GS}$ during the time period T. As a result, the increment of the charging current of the charging switch 130 during the time period T is proportional to the pulse density $D_P$ of the PDM pulses 142 during the time period T.

Advantageously, the charging current can be adjusted by controlling the pulse density of the PDM pulses 142. More specifically, the charging current increases when the pulse density of the PDM pulses 142 increases and the charging current decreases when the pulse density of the PDM pulses 142 decreases.

In one embodiment, the controller 120 can also enable an oscillator 180 which generates a plurality of clock pulses (clock signal) 144 having a constant frequency. As such, a pulse density of the clock pulses 144 is constant. The charge pump 150 receives the clock pulses 144 and generates a driving signal 152 which can fully turn on the charging switch 130, in one embodiment.

The oscillator 180 enabled by the controller 120 can also generate a plurality of clock pulses 146 to control a charge pump 160. In one embodiment, the charge pump 160 is used to receive the plurality of clock pulses 146 and generate a driving signal 162 to control the discharge switch 132.

Figure 1B:
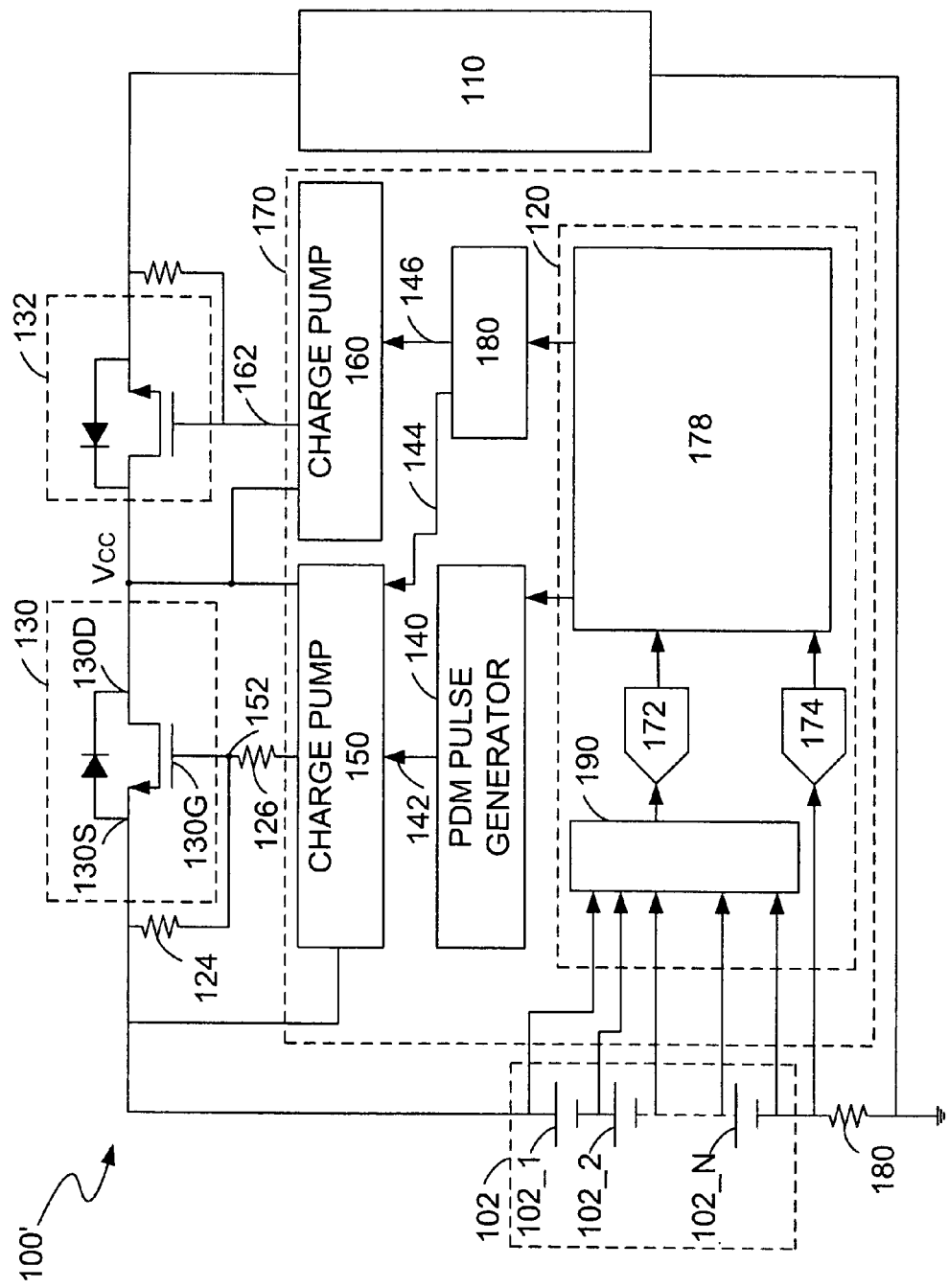
FIG. 1B shows a block diagram of a battery charging system, in accordance with one embodiment of the present invention.

FIG. 1B shows a block diagram of a battery charging system 100', in accordance with one embodiment of the present invention. Elements that are labeled the same as in FIG. 1A have similar functions and will not be repetitively described herein for purposes of brevity and clarity.

As shown in the example of FIG. 1B, the controller 120 includes an A/D (analog-to-digital) converter 172, an A/D converter 174, and a processor 178. In one embodiment, the A/D converter 172 monitors all the cell voltages for cells 102_1-102_n during each cycle (time period T). More specifically, the A/D converter 172 receives a voltage monitoring signal indicative of a cell voltage for each cell of the plurality of cells 102_1-102_n via a multiplexer 190 during each cycle. In one embodiment, the A/D converter 174 monitors a charging current during each cycle (time period T). More specifically, the A/D converter 174 receives a current monitoring signal indicative of a battery charging current via a sense resistor 180. In one embodiment, a processor 178 (e.g., a micro-processor) receives monitoring signals from the A/D converter 172 and the A/D converter 174, and adjusts the pulse density of PDM pulses during each cycle (time period T).

Advantageously, the controller 120 monitors a charging current of the battery pack 102 and a cell voltage for each cell of the plurality of cells 102_1-102_n, and controls the charging current of the battery pack 102. In one embodiment, the processor 178 enables the PDM pulse generator 140 and controls the pulse density of the PDM pulses during pre-charging (e.g., pre-charging can be performed when a battery voltage for the battery pack 102 is less than a predetermined voltage threshold $V_{pre}$ or when a cell voltage is less than a predetermined voltage threshold $V_{pre}$) such that a pre-charging current $I_{pre}$ (I2<$I_{pre}$<I1) flows to the battery pack 102. The charging switch 130 is controlled linearly (that is, the charging switch 130 is operated in the active region) by the driving signal 152. Advantageously, the processor 178 decreases the pulse density when the charging current is greater than a first predetermined threshold I1. The processor 178 increases the pulse density when the charging current is less than a second predetermined threshold I2 that is less than the first predetermined threshold I1. As such, the battery charging system 100' is able to pre-charge the battery pack 102 when the battery voltage is low or zero, in one embodiment.

In one embodiment, the processor 178 disables the PDM pulse generator 140 and enables the oscillator 180 during normal charging (e.g., normal charging can be performed when all the cell voltages of the plurality of cells 102_1-102_n are greater than the predetermined threshold $V_{pre}$) such that a normal charging current $I_{nor}$ flows to the battery pack 102. In one embodiment, the normal charging current $I_{nor}$ is greater than the pre-charging current $I_{pre}$. The charging switch 130 is fully turned on during normal charging, in one embodiment.

Alternatively, the processor 178 can also enable the PDM pulse generator 140 instead of oscillator 180 and controls the pulse density of the PDM pulses during normal charging, in one embodiment. More specifically, the processor 178 increases the pulse density of the PDM pulses 142, such that the voltage of the driving signal 152 is sufficient to fully turn on the charging switch 130. Therefore, a normal charging current $I_{nor}$ can be provided to the battery pack 102.

In one embodiment, the controller 120 also performs battery protection which includes, but is not limited to, over-voltage protection, over-current protection, under-voltage protection, over-temperature protection.

Figure 2:
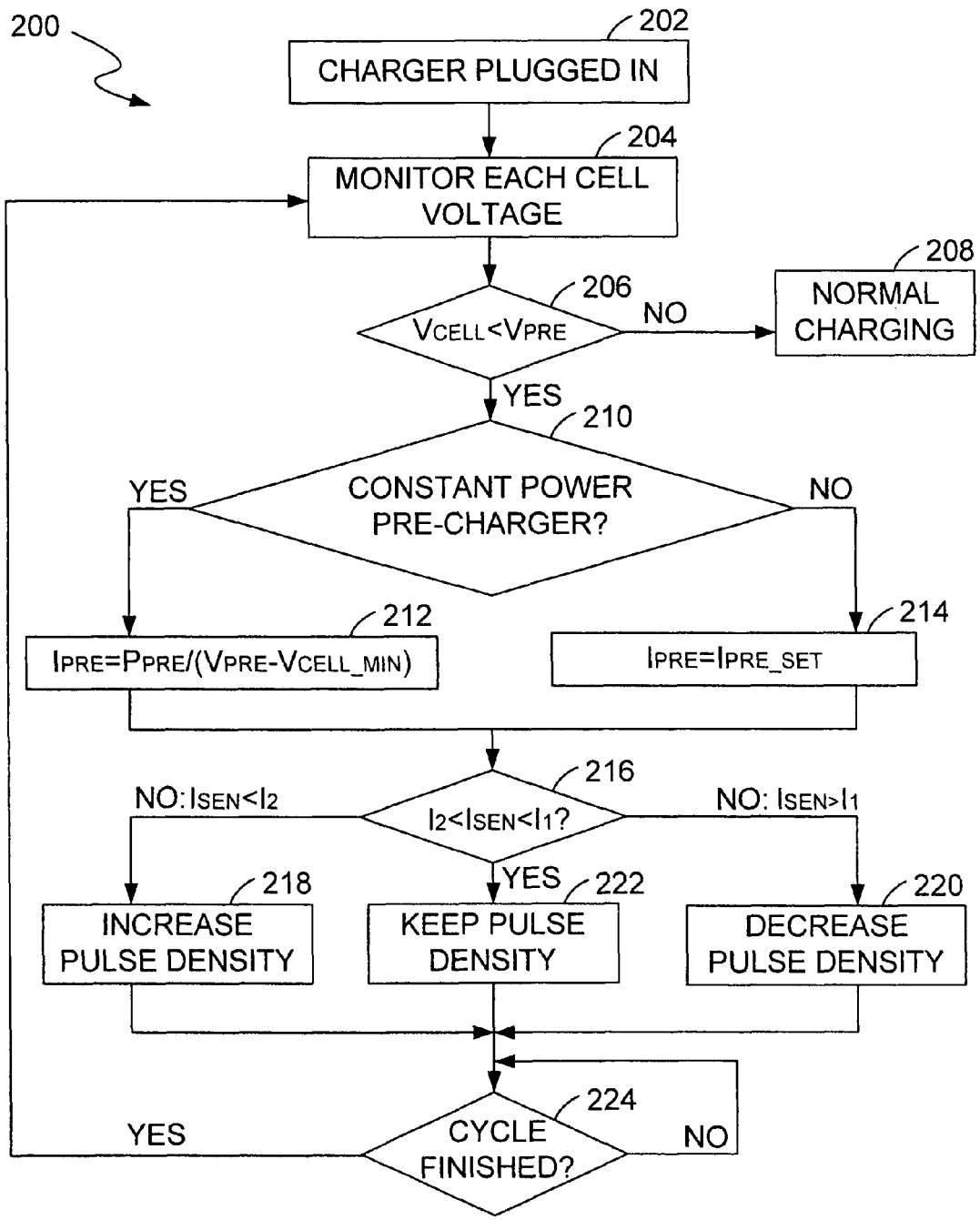
FIG. 2 shows a flowchart of operations performed by a battery charging system, in accordance with one embodiment of the present invention.

FIG. 2 shows a flowchart 200 of operations performed by a battery charging system, in accordance with one embodiment of the present invention. FIG. 2 is described in combination with FIG. 1A and FIG. 1B.

In block 202, the charger 110 is plugged in, such that the battery pack 102 is coupled to the charger 110. In block 204, the battery charging system monitors a cell voltage $V_{cell}$ for each cell 102_1-102_n. More specifically, the A/D converter 172 converts a voltage monitoring signal indicative of the cell voltage $V_{cell}$ for each cell 102_1-102_n to a digital signal, and sends the converted digital signal to the processor 178.

In block 206, the cell voltage $V_{cell}$ for each cell 102_1-102_n is compared with a predetermined voltage threshold $V_{pre}$. If any cell has a cell voltage $V_{cell}$ which is less than the predetermined voltage threshold $V_{pre}$, the flowchart 200 goes to block 210 to perform pre-charging. Otherwise, the flowchart 200 goes to block 206 to perform normal charging. The detailed operation of the normal charging is omitted herein for purposes of brevity and clarity.

During pre-charging, the PDM pulse generator 140 is enabled by the controller 120 and the oscillator 180 is disabled. The battery 102 can be charged by a constant power (that is, the charging power for the battery pack 102 is constant) or it can be charged by a constant current (that is, the charging current for the battery pack is constant), either of which can be selected by a user before charging, in one embodiment. In block 210, if constant power charging is selected, the flowchart 200 goes to block 212 to perform a constant power charging. In block 212, a predetermined pre-charging current flowing to the battery pack 102 can be given by:

$$I_{pre} = \frac{P_{pre}}{V_{pre} - V_{cell\_min}}, \quad (6)$$

where $P_{pre}$ represents a constant preset power level for charging the battery pack 102, which can be defined and programmed by the user before charging, and $V_{cell\_min}$ represents the lowest cell voltage among all the cell voltages for cells 102_1-102_n.

In block 210, if constant power charging is not selected, the flowchart 200 goes to block 214 to perform constant current charging. In block 214, a predetermined pre-charging current flowing to the battery pack 102 can be given by:

$$I_{pre} = I_{pre\_set}, \quad (7)$$

where $I_{pre\_set}$ is a preset constant current level which can be defined and programmed by the user before charging.

In block 216, a charging current $I_{sen}$ monitored from the sense resistor 180 is compared with a first predetermined threshold I1 and a second predetermined threshold I2. More specifically, the processor 178 receives a current monitoring signal indicative of the charging current from the sense resistor 180, and compares the current monitoring signal with the first predetermined threshold I1 and the second predetermined threshold I2. In one embodiment, the first predetermined threshold I1 and the second predetermined threshold I2 are given by:

$$I1 = I_{pre} + I_{hys}, I2 = I_{pre} - I_{hys}, \quad (8)$$

where $I_{hys}$ represents a hysteresis value which can be used to reduce oscillation of the charging current.

In block 216, if the monitored charging current $I_{sen}$ is greater than the second predetermined threshold I2 and less than the first predetermined threshold I1 (I2<$I_{sen}$<I1), the flowchart 200 goes to block 222. In block 222, the pulse density is unchanged. More specifically, the processor 178 maintains the pulse density of the PDM pulses generated by the PDM pulse generator 140 in order to keep the charging current.

Otherwise, if the monitored charging current $I_{sen}$ is greater than the first predetermined threshold I1($I_{sen}$>I1), the flowchart 200 goes to block 220. In block 220, the pulse density is decreased. More specifically, the processor 178 decreases the pulse density of the PDM pulses 142 generated by the PDM pulse generator 140 in order to reduce the charging current.

Otherwise, if the monitored charging current $I_{sen}$ is less than the second predetermined threshold I2 ($I_{sen}$<I2), the flowchart 200 goes to block 218. In block 218, the pulse density is increased. More specifically, the processor 178 increases the pulse density of the PDM pulses 142 generated by the PDM pulse generator 140 in order to increase the charging current.

Advantageously, by adjusting the pulse density of the PDM pulses 142, the charging current can be controlled within a predetermined range. More specifically, the charging current can be controlled such that the charging current is less than a first predetermined threshold I1 ($I1=I_{pre}+I_{hys}$) and is greater than a second predetermined threshold I2 ($I2=I_{pre}-I_{hys}$). The hysteresis value $I_{hys}$ is used to reduce oscillation of the charging current, in one embodiment.

In block 224, if a cycle (time period T) is finished, the flowchart 200 returns to block 204. Any repetitive description following block 204 that has been described above will be omitted herein for purposes of clarity and brevity. Otherwise, the flowchart 200 returns to block 224. Accordingly, the processor 178 adjusts the pulse density during each cycle (time period T).

Figure 3:
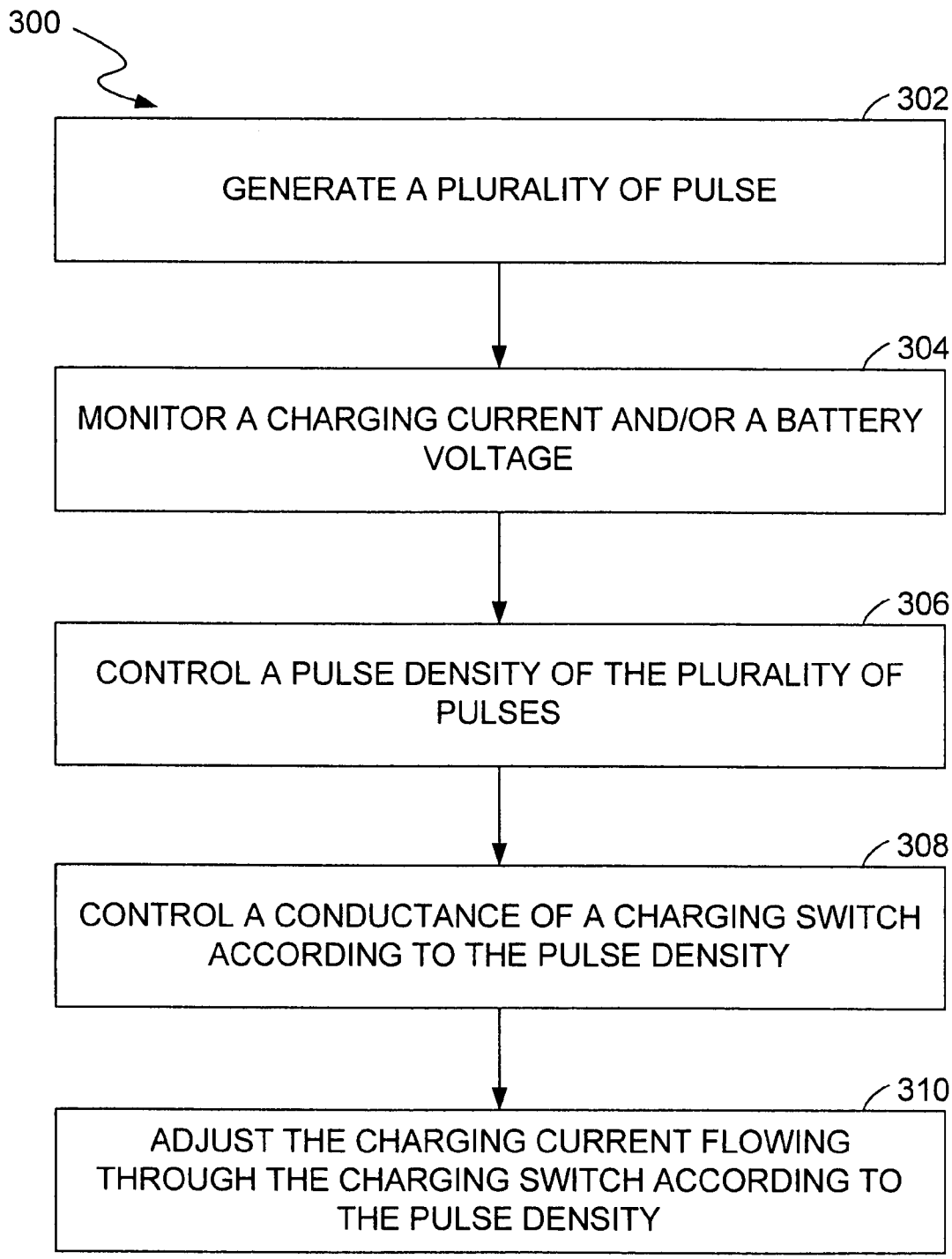
FIG. 3 shows a flowchart of operations performed by a battery charging system, in accordance with one embodiment of the present invention.

FIG. 3 shows a flowchart 300 of operations performed by a battery charging system, in accordance with one embodiment of the present invention. FIG. 3 is described in combination with FIG. 1A and FIG. 1B.

In block 302, the battery charging system generates a plurality of pulses 142 by a pulse generator 140 (e.g., a PDM pulse generator). In block 304, the battery charging system monitors a charging current flowing to the battery pack 102. The battery charging system can also monitor a battery voltage and/or individual cell voltages for the plurality of cells 102_1-102_n in the battery pack 102.

In block 306, the battery charging system controls a pulse density of the plurality of pulses. More specifically, the battery charging system decreases the pulse density when the charging current is greater than a first predetermined threshold I1. The battery charging system increases the pulse density when the charging current is less than a second predetermined threshold I2 that is less than the first predetermined threshold I1.

In block 308, the battery charging system controls a conductance of a charging switch 130 according to the pulse density. Accordingly, the charging current flowing through the charging switch 130 to the battery pack 102 can be adjusted according to the pulse density of the pulses 142 as shown in block 310. Advantageously, the battery charging current can be controlled such that the battery charging current is less than the first predetermined threshold I1 and greater than the second predetermined threshold I2.

Accordingly, a battery charging system is provided. In one embodiment, the battery charging system adjusts a charging current by controlling a pulse density of a plurality of pulses. Advantageously, in one embodiment, an n-channel metal oxide field effect transistor can be used as a charging switch, which saves costs and reduces power dissipation. Furthermore, the battery charging system is able to charge the battery when a battery voltage is low or zero, in one embodiment.

While the foregoing description and drawings represent embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. A charging circuit for charging a battery, comprising:
a pulse generator for generating a plurality of pulses to control an N-channel metal-oxide-semiconductor field-effect transistor (NMOSFET);
a controller coupled to said pulse generator for controlling a pulse density of said plurality of pulses according to a status of said battery;
a charge pump coupled to said pulse generator for receiving said plurality of pulses and for generating a driving signal; and
a resistor coupled to a gate of said NMOSFET, wherein said resistor and a capacitance of said gate of said NMOSFET form a low pass filter, wherein said driving signal is filtered by said low pass filter to control a gate voltage of said NMOSFET, wherein a variation of a gate-source voltage of said NMOSFET is proportional to said pulse density, and wherein a variation of a charging current flowing through said NMOSFET to said battery is proportional to said pulse density.

2. The charging circuit as claimed in claim 1, wherein said pulse generator comprises a pulse density modulation pulse generator.

3. The charging circuit as claimed in claim 1, wherein said controller comprises a processor.

4. The charging circuit as claimed in claim 1, wherein said controller monitors said charging current.

5. The charging circuit as claimed in claim 1, wherein said controller monitors a battery voltage of said battery charged by said charging current.

6. The charging circuit as claimed in claim 1, wherein said controller monitors a cell voltage for each cell of a plurality of cells charged by said charging current.

7. The charging circuit as claimed in claim 1, wherein said controller controls said pulse density when a battery voltage of said battery charged by said charging current is less than a predetermined voltage threshold.

8. The charging circuit as claimed in claim 1, wherein said controller controls said pulse density when a cell voltage for each cell of a plurality of cells charged by said charging current is less than a predetermined voltage threshold.

9. The charging circuit as claimed in claim 1, wherein said pulse density decreases when said charging current is greater than a first predetermined threshold.

10. The charging circuit as claimed in claim 9, wherein said pulse density increases when said charging current is less than a second predetermined threshold that is less than said first predetermined threshold.

11. The charging circuit as claimed in claim 1, further comprising:
an oscillator for generating a plurality of clock pulses,
wherein said charge pump receives said plurality of clock pulses and for generating said driving signal which turns on said charging switch.

12. The charging circuit as claimed in claim 11, wherein said charging circuit powers off said oscillator and powers on said pulse generator when a voltage of said battery is less than a threshold, powers off said pulse generator and powers on said oscillator when said voltage is greater than said threshold.

13. A method for charging a battery, comprising:
generating a plurality of pulses to control an N-channel metal-oxide-semiconductor field-effect transistor (NMOSFET);
controlling a pulse density of said plurality of pulses according to a status of said battery;

generating a driving signal based on said pulse density of said plurality of pulses;

filtering said driving signal by a low pass filter formed by a resistor coupled to a gate of said NMOSFET and a capacitance of said gate of said NMOSFET;

controlling a gate voltage of said NMOSFET by said driving signal, wherein a variation of a gate-source voltage of said NMOSFET is proportional to said pulse density, and wherein a variation of a charging current flowing through said NMOSFET to said battery is proportional to said pulse density.

14. The method as claimed in claim 13, further comprising:
decreasing said pulse density when said charging current is greater than a first predetermined threshold.

15. The method as claimed in claim 13, further comprising:
monitoring said charging current.

16. The method as claimed in claim 13, further comprising:
monitoring a voltage of said battery.

17. The method as claimed in claim 14, further comprising:
increasing said pulse density when said charging current is less than a second predetermined threshold that is less than said first predetermined threshold.

18. An electronic device comprising:
a charger for charging a battery;
a charging circuit coupled to said battery and said charger for controlling a charging current from said charger to said battery, comprising:

a pulse generator for generating a plurality of pulses to control an N-channel metal-oxide-semiconductor field-effect transistor (NMOSFET) coupled between said charger and said battery;

a controller coupled to said pulse generator for controlling a pulse density of said plurality of pulses according to a status of said battery;

a charge pump coupled to said pulse generator for receiving said plurality of pulses and for generating a driving signal; and a resistor coupled to a gate of said NMOSFET, wherein said resistor and a capacitance of said gate of said NMOSFET form a low pass filter, wherein said driving signal is filtered by said low pass filter to control a gate voltage of said NMOSFET, wherein a variation of a gate-source voltage of said NMOSFET is proportional to said pulse density, and wherein a variation of said charging current flowing through said NMOSFET to said battery is proportional to said pulse density.

19. The charging circuit as claimed in claim 18, wherein said pulse density decreases when said charging current is greater than a first predetermined threshold.

20. The electronic device as claimed in claim 19, wherein said pulse density increases when said charging current is less than a second predetermined threshold that is less than said first predetermined threshold.

* * * * *